Feb. 14, 1939.                R. CATASTA                2,147,089
OPTICAL OBSERVATION APPARATUS FOR ARMORED VEHICLES
Filed Dec. 23, 1935
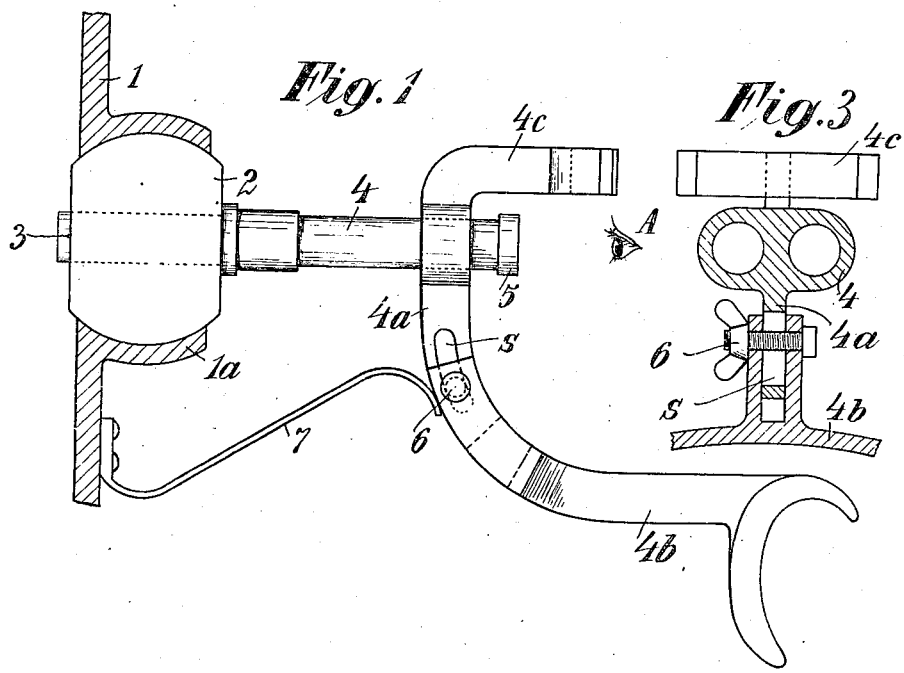
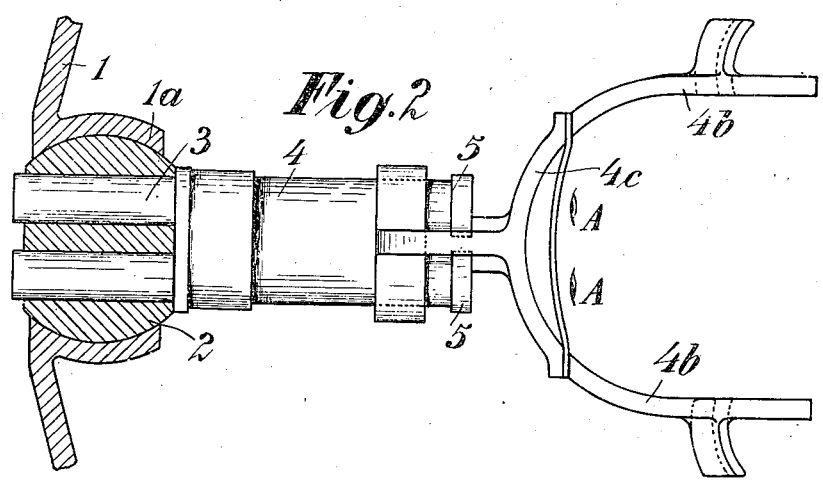

Patented Feb. 14, 1939

2,147,089

UNITED STATES PATENT OFFICE 2,147,089

OPTICAL OBSERVATION APPARATUS FOR ARMORED VEHICLES

Romulus Catasta, Vienna, Austria, assignor to Oesterr Ung. Optische Anstalt C. P. Goerz Gesellschaft m. b. H., Vienna, Austria Application December 23, 1935, Serial No. 55,893
In Austria December 29, 1934

4 Claims. (Cl. 88—1)

The invention has for its object to permit the driver of an armored vehicle to observe the road travelled by means of an optical observation device such as a telescope having a large field of vision, the support of the observation apparatus having to be so constructed that the observer, in spite of the shocks being transmitted to his body by inequalities of the route or by rough seas or otherwise, can continuously cover the field of vision without releasing the steering wheel or any other steering device.

This object is attained, according to the invention, by the observation appliance or telescope being carried at the objective end in the wall of the vehicle by a universal joint, ball joint or simply rotatable in one plane, whilst at the eye piece end it is flexibly suspended or is supported on the body of the observer, for example, on his shoulders or head.

The invention is shown by way of example on the annexed drawing, Fig. 1 being a side view of the telescope suspension and Fig. 2 a plan view, partially in section, whilst Fig. 3 is a cross-section.

In the drawing, 1 represents the front armor plate of the driver's or steerer's seat, the projecting part 1ª of which is formed with a spherical seat and embraces a ball joint 2, which has two parallel holes to take the objective ends 3 of a double telescope mounted in the casing 4 and the eye-piece ends 5 of which are to be carried at a suitably selected distance in front of the eyes A—A of the vehicle driver. To this end, the telescope mount is provided with a fork-shaped shoulder piece 4a—4b which must be so shaped that the eyes A of the vehicle driver are in the optical axes of the double telescope when the two shoulder supports are properly fitted on the shoulders of the driver. For this purpose, the shoulder support is in two parts, the part 4a fitting on the telescope mount being provided with a longitudinal slot, whilst the forked part 4b embracing it is provided with the clamping screw 6 passing through the slot S of the first part, by the tightening up of which screw the shoulder 4b can be firmly held in the proper position. Simultaneously with this shoulder support 4b or instead thereof, a forehead strap 4c can be used. In the latter case, it would be preferable to employ also a flexible support for the telescope mounting, for example, a spring 7 fixed on the front armored plate 1 of the driver's seat.

As is clear, by means of this support at the eye-piece end of the telescope on the body of the observer, all involuntary movements of the body caused by shocks on uneven routes or by rough seas or otherwise are transferred to the observation instrument, so that it is possible for the observer, in spite of all his unforeseen movements, to continuously regard the route to be travelled to the extent of the field of vision of the telescope.

What I claim is:

1. In an armored vehicle including a wall and an opening therein, a sighting device comprising a parti-spherical seat within the vehicle on said wall adjacent said opening, a ball member mounted for universal movement in said seat, a binocular observing instrument comprising an objective end and an eyepiece end, said ball member being provided with parallel openings extending substantially axially therethrough, said objective end being arranged in said parallel openings, and a pair of instrument-controlling arms arranged at the eyepiece end of the instrument, one end of each arm being fixed to the eyepiece end of the instrument and the free end of each arm being so constructed and arranged as to fit the shoulders of the vehicle operator in such manner that his eyes are always in the optical axes of the instrument, whereby he is enabled to point the latter without using his hands for this purpose.

2. In an armored vehicle including a wall and an opening therein, a sighting device comprising a parti-spherical seat within the vehicle on said wall adjacent said opening, a ball member mounted for universal movement in said seat, a binocular observing instrument comprising an objective end and an eyepiece end, said ball member being provided with parallel openings extending substantially axially therethrough, said objective end being arranged in said parallel openings, and a pair of instrument-controlling arms arranged at the eyepiece end of the instrument, one end of each arm being fixed to the eyepiece end of the instrument and the free end of each arm being so constructed and arranged as to fit the shoulders of the vehicle operator in such manner that his eyes are always in the optical axes of the instrument, whereby he is enabled to point the latter without using his hands for this purpose, and means for adjusting the shoulder-fitting free ends of said arms with reference to the instrument.

3. In an armored vehicle including a wall and an opening therein, a sighting device comprising a parti-spherical seat within the vehicle on said wall adjacent said opening, a ball member mounted for universal movement in said seat, a binocular observing instrument comprising an objective end and an eyepiece end, said ball member being provided with parallel openings extending substantially axially therethrough, said objective end being arranged in said parallel openings, and a pair of instrument-controlling arms arranged at the eyepiece end of the instrument, one end of each arm being fixed to the eyepiece end of the instrument, and adjustable shoulder supports for the eyepiece end of said instrument, said shoulder supports being adapted to fit on the shoulders of the vehicle operator and being so constructed and arranged that when the said supports are fitted on the shoulders of the operator, his eyes are always in the optical axes of the instrument whereby he is enabled to point the latter without using his hands for this purpose.

4. In an armored vehicle including a wall and an opening therein, a sighting device comprising a parti-spherical seat within the vehicle on said wall adjacent said opening, a ball member mounted for universal movement in said seat, a binocular observing instrument comprising an objective end and an eyepiece end, said ball member being provided with parallel openings extending substantially axially therethrough, said objective end being arranged in said parallel openings, a forehead strap fixed to the eyepiece end, and a pair of instrument-controlling arms arranged at the eyepiece end of the instrument, one end of each arm being fixed to the eyepiece end of the instrument and the free end of each arm being so constructed and arranged as to fit the shoulders of the vehicle operator in such manner that his eyes are always in the optical axes of the instrument, whereby he is enabled to point the latter without using his hands for this purpose.

ROMULUS CATASTA.